Dec. 7, 1926.

S. A. GOLDBERG

PHONOGRAPH TURNTABLE

Filed Nov. 20, 1925

1,610,130

WITNESSES

INVENTOR
SIFTON A. GOLDBERG
BY
ATTORNEYS

Patented Dec. 7, 1926.

1,610,130

UNITED STATES PATENT OFFICE.

SIFTON ABRAHAM GOLDBERG, OF BROOKLYN, NEW YORK, ASSIGNOR TO PLAZA MUSIC COMPANY, OF NEW YORK, N. Y., A CORPORATION OF NEW YORK.

PHONOGRAPH TURNTABLE.

Application filed November 20, 1925. Serial No. 70,357.

This invention relates to an improved turntable particularly adapted for use with phonographs of the portable type.

An object of the invention is to provide a simple, efficient, strong, durable turntable which can be very economically manufactured and used in connection with a portable phonograph to support discs of standard sizes, and yet be capable of being collapsed when not in use to occupy a very small area, so that it will lie well within the area defined by the box and the cover which usually contain a portable phonograph.

The invention is illustrated in the drawings, of which Figure 1 is a plan view of the top of a phonograph box showing the turntable, the supporting leaves of which are shown in their inoperative positions in full line and are shown in their operative positions in dotted lines.

In its general aspect the invention comprises a rotatable plate of a small diameter which can be mounted in association with a rotating shaft extending above the top of a box. On this plate or disc I mount a plurality of pivoted leaves which, when swung outwardly will extend beyond the area of the disc to act as supporting surfaces for phonograph records, thus increasing the natural inherent supporting capacity of the disc itself. The disc is provided with suitable stop pins adjacent the pivoted points of the leaves to limit their outward movement so that they cannot be moved beyond the point of maximum radius. This will insure the proper positioning of the leaves. Preferably the leaves are provided with suitable cushioning covering such as felt to enable them to make contact with the articles to be supported and to properly grip them without injury.

Figure 1:
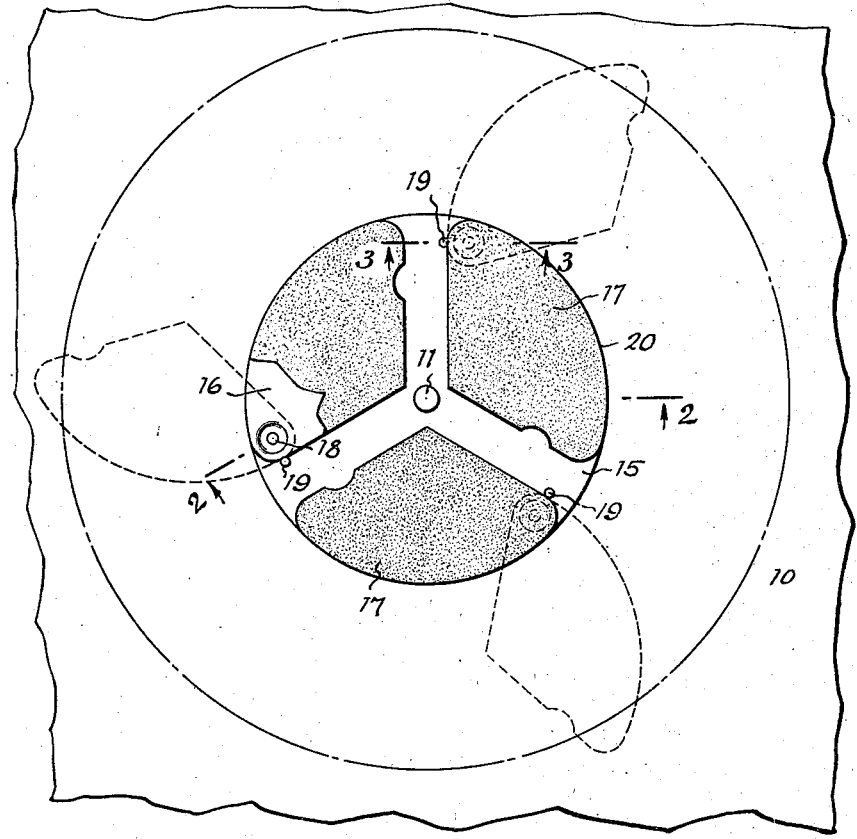
Figure 2:
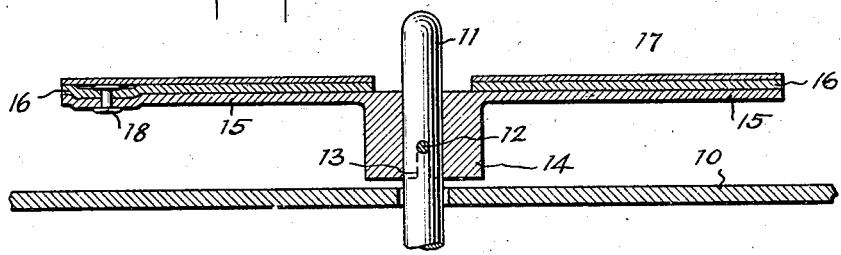
Figure 2 is a section taken on the line 2—2 of Figure 1.
Figure 3:
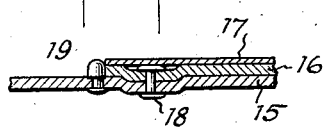
Figure 3 is a section taken on the line 3—3 of Figure 1.

In the preferred form of the invention I provide a phonograph having a top plate 10 through which the upper end 11 of a rotatable shaft extends. The shaft is provided with a transverse pin 12 to be engaged by a groove 13 formed in a hub 14, attached to a disc or plate 15. This disc or plate 15 is provided with a plurality of leaves 16, preferably sector shaped and in the form of a plate and pivoted to the disc 15, at symmetrically placed points around its circumference preferably near the edges of the disc. Each of these leaves is covered with suitable cushioning material such as felt 17. The leaves are preferably pivoted to the disc by means of rivets 18. These leaves are adapted to be swung outwardly, as shown in dotted lines in Figure 1, so as to increase the normal supporting radius of the disc 15. Stop pins 19 are disposed adjacent the pivot points of the leaves, so that when the leaves are swung outwardly their edges will encounter these stop pins to limit their further movement.

In the operation of the device, therefore, it is merely necessary to move the leaves outwardly until their further movement is interrupted by the pins 19. Their radius in this extended position will permit records of standard size to be supported thereby. When not in use, the leaves are moved inwardly to the position shown in full lines in Figure 1. The pins 19 limit the inward movement of the leaves 16 over the disc 15, which therefore insures an orderly assemblage of the leaves 16. The cushioning cover on the leaves permits the records to be gripped firmly without damage to the surface thereof.

What I claim is:

1. A turn table which comprises a rotatable plate a plurality of pivoted auxiliary plates fastened to the main plate near its periphery and adapted to be moved around their pivot points outwardly therefrom to enlarge the supporting radius of the table, said auxiliary plates, when not in use, adapted to be swung inwardly to lie within the area of the main plate.

2. A turntable which comprises a rotatable plate a plurality of pivoted auxiliary plates fastened to the main plate near its periphery and adapted to be moved outwardly therefrom around their pivot points to enlarge the supporting radius of the table, said auxiliary plates when not in use adapted to be swung inwardly to lie within the area of the main plate and pins disposed respectively adjacent the auxiliary plates to limit the outward and inward movement of the auxiliary plates.

SIFTON ABRAHAM GOLDBERG.